(12) United States Patent
Tokushige et al.

(10) Patent No.: US 7,442,744 B2
(45) Date of Patent: Oct. 28, 2008

(54) POLYARYLENE SULFIDE RESIN COMPOSITION AND COATED MOLDING

(75) Inventors: Kazutomo Tokushige, Shizuoka (JP); Sei Wakatsuka, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 455 days.

(21) Appl. No.: 10/558,636

(22) PCT Filed: Jun. 3, 2004

(86) PCT No.: PCT/JP2004/008068

§ 371 (c)(1),
(2), (4) Date: Nov. 30, 2005

(87) PCT Pub. No.: WO2004/108828

PCT Pub. Date: Dec. 16, 2004

(65) Prior Publication Data

US 2006/0270793 A1    Nov. 30, 2006

(30) Foreign Application Priority Data

Jun. 5, 2003   (JP) .............................. 2003-160621

(51) Int. Cl.
*C08L 81/00* (2006.01)
*C08L 51/00* (2006.01)
(52) U.S. Cl. .......................................... 525/65; 525/69
(58) Field of Classification Search ................... 525/65, 525/69
See application file for complete search history.

(56) References Cited

FOREIGN PATENT DOCUMENTS

| EP | 0142825 | 5/1985 |
|---|---|---|
| EP | 0327300 | 8/1989 |
| EP | 0345094 A1 | 12/1989 |
| EP | 0890616 A1 | 1/1999 |
| JP | 58154757 | 9/1983 |
| JP | 59152953 | 8/1984 |
| JP | 59207921 | 11/1984 |
| JP | 60-120753 | 6/1985 |
| JP | 62151460 | 6/1987 |
| JP | 1-198664 | 10/1989 |
| JP | 1-306467 | 11/1989 |
| JP | 2123160 | 10/1990 |
| JP | 4-304264 A | 10/1992 |
| JP | 6299071 | 10/1994 |
| JP | 10-53705 A | 2/1998 |
| JP | 10-279802 A | 10/1998 |
| JP | 11049952 | 2/1999 |
| JP | 2000-198923 A | 7/2000 |

OTHER PUBLICATIONS

Orikasa, translation of Japanese patent JP 04-306259 Oct. 1992.*
Toray Industries, electronic translation of the specification of JP 2000-198923, Jul. 2000.*

* cited by examiner

*Primary Examiner*—Jeffrey C Mullis
(74) *Attorney, Agent, or Firm*—Buchanan Ingersoll & Rooney PC

(57) ABSTRACT

The present invention is improved in an enhanced impact resistance of a molded article of a PAS resin and continuous molding (mold release improvement) in mass production and adhesion to coating. The present invention provides a polyarylene sulfide resin composition comprising (A) 100 parts by weight of a polyarylene sulfide resin, (B) 1-20 parts by weight of a graft copolymer formed by the branching or crosslinking chemical bond of an olefin-based copolymer (b-1) and at least one polymer or copolymer (b-2), the olefin copolymer (b-1) composed mainly of an α-olefin and an α,β-unsaturated carboxylic acid ester without a glycidyl group, the polymer or copolymer (b-2) constituted of a specific repeating unit, and (C) 1-20 parts by weight of an olefin copolymer composed mainly of an α-olefin and a glycidyl ester of an α,β-unsaturated carboxylic acid.

20 Claims, No Drawings

POLYARYLENE SULFIDE RESIN COMPOSITION AND COATED MOLDING

TECHNICAL FIELD

The present invention relates to a polyarylene sulfide resin composition having an excellent adhesion with coating and impact properties, and specifically to a polyarylene sulfide resin composition having an excellent adhesion with coating and impact properties required in the uses of various housings, casings, covers, and the like which emphasize the surface appearance, and to a coated molded article thereof.

RELATED ARTS

Polyarylene sulfide (hereinafter referred to as "PAS") resins represented by polyphenylene sulfide (hereinafter referred to as "PPS") resins are known as the resins having superior heat-resistance, mechanical properties, resistance to chemicals, dimensional stability, and flame-retardancy. Specifically owing to their high rigidity and small warp-deformation during molding operation, PAS resins have been widely used as parts such as various housings, casings, and covers in automobiles, household electric appliances, electric and electronic component, and the like. The PAS resins, however, are poor in toughness and are brittle, and further they have insufficient mechanical properties typically in impact properties so that they have drawbacks of being fragile on falling down and of having poor adhesion with coating being applied to provide surface finish and to provide functionalities because of the chemical inactiveness of the surface of molded article.

There have been proposed various methods in the past for improving the impact properties of PAS resins, including polymer blending and polymer alloying using various flexible polymers. For example, there are examples of an olefin-based copolymer composed of an α-olefin and an acrylic acid ester, or a modified copolymer thereof, (JP-A59-207921, JP-A 60-120753, JP-A 62-151460, and JP-A 2-123160). These resin compositions, however, give insufficient effect for improving the impact properties, and fail to attain satisfactory adhesion with coating.

Other examples use an olefin-based copolymer composed mainly of an α-olefin and a glycidyl ester of an α,β-unsaturated acid, (JP-A58-154757, JP-A59-152953, and JP-A 1-198664). Although these provided resin compositions have superior impact properties, they significantly increase the mold-releasing resistance on taking out the molded article from the mold in molding process such as injection molding, thus failing to perform continuous molding operations due to the poor mold-releasability.

Correspondingly, in order to improve the poor mold-releasability, there are proposed methods using an olefin copolymer of ethylene and an α-olefin having 5 or more carbon atoms, (JP-A 11-49952), and using both an olefin-based copolymer, composed mainly of an α-olefin and a glycidyl ester of an α,β-unsaturated acid, and other olefin-based elastomer, (JP-A 1-306467 and JP-A 6-299071). These provided methods, however, have a problem of significantly decreasing the adhesion with coating, which adhesion is required for the appearance-emphasized articles, caused by the addition of other olefin-based copolymer or olefin-based elastomer, thus they are difficult to apply to various housings, casings, covers, and the like, and their use ranges are limited.

DISCLOSURE OF THE INVENTION

The present invention will solve the above problems in the related art and to provide a PAS resin composition having been improved in impact properties and adhesion with coating.

The inventors of the present invention investigated the improvement in the impact properties of PAS resin molded articles and conducted detail studies for the simultaneous improvements of the continuous moldability (improvement in the mold-releasability) in mass production mode, and of the adhesion with coating. Through the studies, the inventors of the present invention found that a PAS resin composition having impact properties, continuous moldability, and adhesion with coating is obtained by the addition of two specified kinds of olefin-based copolymers to a PAS resin at a specified mixing rate, thus perfected the present invention.

The present invention provides a polyarylene sulfide resin composition which contains (A) 100 parts by weight of a polyarylene sulfide resin; (B) 1 to 20 parts by weight of a graft copolymer composed of (b-1) an olefin-based copolymer composed mainly of an α-olefin and an α,β-unsaturated carboxylic acid ester, without containing glycidyl group, and (b-2) at least one polymer or copolymer composed of a repeating unit expressed by the formula (1), (b-2) being chemically bonded in branching or crosslinking on (b-1),

(1)

where R is a hydrogen atom or a lower alkyl group, and X is one or more groups selected from —COOCH$_3$, —COOC$_2$H$_5$, —COOC$_4$H$_9$, —COOCH$_2$CH(C$_2$H$_5$)C$_4$H$_9$, —C$_6$H$_5$, and —CN; and (C) 1 to 20 parts by weight of an olefin-based copolymer composed mainly of an α-olefin and a glycidyl ester of an α,β-unsaturated acid.

The present invention further provides a composition containing above (A), (B), and (C). The present invention further provides a coated molded article of the above-polyarylene sulfide resin composition. The present invention further provides uses of the polyarylene sulfide resin composition to coated molded articles.

DETAILED EXPLANATION OF THE INVENTION

The structural components of the present invention are described below in detail. The PAS resin as the (A) component according to the present invention is structured mainly by —(Ar—S)—, (Ar is the arylene group), as the repeating unit. Examples of the arylene group are p-phenylene group, m-phenylene group, o-phenylene group, substituted phenylene group, p,p'-diphenylene sulfone group, p,p'-biphenylene group, p,p'-diphenylene ether group, p,p'-diphenylene carbonyl group, and naphthalene group. Among the arylene sulfide groups composed of the above-arylene groups, copolymers containing different kinds of repeating units may be preferable, other than the polymer using the same repeating units, or the homopolymer, in some cases, in view of processability of the composition.

A specifically preferable homopolymer is the one using the repeating unit of p-phenylene sulfide group, applying p-phenylene group as the arylene group. The copolymer may use two or more combinations of different kinds of arylene sulfide groups structured by the above-arylene group. As of these combinations, the one containing p-phenylene sulfide group and m-phenylene sulfide group is particularly preferred. In view of physical properties such as heat-resistance, moldability, and mechanical properties, a preferred combination contains 70% by mole or more of p-phenylene sulfide group, more preferably 80% by mole or more.

Among these PAS resins, specifically preferred one is a high-molecular weight polymer having substantially a straight chain structure, obtained by condensation polymerization of monomer composed mainly of a bifunctional halogen aromatic compound. Other than the PAS resin having the straight chain structure, however, there is applicable a polymer having part-branching or -crosslinking structure being formed by using a small amount of monomer such as a polyhalo-aromatic compound containing three or more of halogen-substituents during condensation polymerization, and there is further applicable a polymer which improved the moldability by heating a low molecular weight straight-chain structure polymer to high temperature in the presence of oxygen or an oxidizer to increase the melt-viscosity through the oxidation crosslinking or the thermal crosslinking. In addition, regarding the PAS resin as the (A) component, there is also a preferred mixture of the above-described straight chain PAS (10 to 300 Pa·s of viscosity at 310° C. and 1200 sec$^{-1}$ of shear rate) as the main component and a branched or crosslinked PAS resin having relatively high viscosity (300 to 3000 Pa·s, preferably 500 to 2000 Pa·s) by the amounts of 1 to 30% by weight, preferably 2 to 25% by weight.

After the polymerization, the PAS resin according to the present invention is preferably treated by washing with acid, washing with hot water, and washing with organic solvent, (or combination thereof), to remove impurities such as by-products, thus to purify the resin.

Next, the (B) graft copolymer according to the present invention is a graft copolymer composed of (b-1) an olefin-based copolymer composed mainly of an α-olefin and an α,β-unsaturated carboxylic acid ester, without containing glycidyl group, and one or more types of (b-2) a polymer or copolymer composed of a repeating unit expressed by the formula (1), the (b-1) olefin-based copolymer and the (b-2) polymer or copolymer being chemically bonded in branching or crosslinking mode with each other,

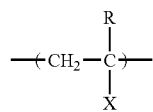
(1)

where R is a hydrogen atom or a lower alkyl group, and X is one or more types of groups selected from —COOCH$_3$, —COOC$_2$H$_5$, —COOC$_4$H$_9$, —COOCH$_2$CH(C$_2$H$_5$)C$_4$H$_9$, —C$_6$H$_5$, and —CN.

Here, the α-olefin which is one of the monomers structuring the (b-1) olefin-based copolymer is preferably ethylene, propylene, butylene, hexene, or octene. Among them, ethylene is specifically preferred. Two or more types of these α-olefins may be used together.

In addition examples of the α,β-unsaturated carboxylic acid ester as another monomer are methyl acrylate, ethyl acrylate, methyl methacrylate, ethyl methacrylate, butyl acrylate, and butyl methacrylate. Among them, methyl acrylate, ethyl acrylate, and methyl methacrylate are preferred.

The polymers of these α-olefin and α,β-unsaturated carboxylic acid ester can be obtained through the copolymerization using a known radical polymerization reaction. Preferable ratios of the α-olefin and the α,β-unsaturated carboxylic acid ester for the copolymerization are in a range from 1 to 50 parts by weight, more preferably from 10 to 40 parts by weight, of the α, β-unsaturated carboxylic acid ester to 100 parts by weight of the α-olefin.

To attain the object of the present invention, it is essential that the (b-1) olefin-based copolymer structured mainly of an α-olefin and an α,β-unsaturated carboxylic acid ester does not contain glycidyl group.

In addition, the graft copolymer in the (B) component according to the present invention is a graft copolymer composed of the (b-1) olefin-based copolymer and one or more types of (b-2) a polymer or copolymer composed of a repeating unit expressed by the formula (1), the (b-1) olefin-based copolymer and the (b-2) polymer or copolymer being chemically bonded in branching or crosslinking mode with each other. A copolymer which does not chemically bond the (b-2) component cannot attain the improvement effect of adhesion with coating.

Applicable polymer segment or copolymer segment for graft polymerization as the branching chain or the crosslinking chain includes a polymer or a copolymer obtained from one or more types of monomers of acrylic acid, methacrylic acid, methyl acrylate, methyl methacrylic acid, butyl acrylate, butyl methacrylate, acrylonitrile, and styrene, preferably a polymer of methyl methacrylate, a copolymer of acrylonitrile and styrene, a copolymer of methyl methacrylate and butyl acrylate, and the like. These polymers or copolymers can be obtained from known radical polymerization.

The branching reaction and the crosslinking reaction of these polymers or copolymers can also be readily prepared by radical reactions. For example, the desired (B) graft copolymer can be prepared by generating free radicals in the (b-2) polymer or copolymer using a peroxide or the like, then by melt-extruding the (b-1) olefin-based copolymer.

Here, the ratio of (b-1) to (b-2) for structuring the graft copolymer of the (B) component is in a range from 95:5 to 40:60, preferably from 90:10 to 60:40.

The (b-2) polymer or copolymer functioning as the branching chain or the crosslinking chain is preferably branched or crosslinked by the amounts from 10 to 100 parts by weight to 100 parts by weight of the (b-1) olefin-based copolymer.

The mixing amount of the (B) graft copolymer is in a range from 1 to 20 parts by weight, preferably from 2 to 15 parts by weight, to 100 parts by weight of the (A) PAS resin. If the amount of the (B) component is excessively small, the mold-releasing resistance during molding increases, which fails to perform continuous molding operations. If the amount of the (B) component is excessively large, the dispersibility of the (B) component in the (A) PAS resin becomes worse, which deteriorates the physical properties such as impact properties.

Next, the olefin-based copolymer in the (C) component according to the present invention is an olefin-based copolymer structured mainly by an α-olefin and a glycidyl ester of an α,β-unsaturated acid. Different from the (B) component, the (C) component is required to have glycidyl group in the molecular structure.

The α-olefin which is one of the monomers structuring the (C) olefin-based copolymer includes ethylene, propylene, butylene, hexene, octane, and the like. Among them, ethylene is preferable. Two or more types of these α-olefins may be used together. The glycidyl ester of an α,β-unsaturated acid as another monomer includes glycidyl ester of acrylic acid, glycidyl ester of methacrylic acid, glycidyl ester of ethacrylic acid, glycidyl ester of itaconic acid, glycidyl ester of citraconic acid and the like. Among them, glycidyl ester of methacrylic acid is preferred.

The olefin-based copolymer structured by an α-olefin (such as ethylene) and a glycidyl ester of an α, β-unsaturated acid can be obtained by copolymerization through a known radical polymerization reaction. The (C) olefin-based copolymer is preferably copolymerized using 1 to 40 parts by weight of a glycidyl ester of an α,β-unsaturated acid to 100 parts by weight of an α-olefin.

Furthermore, similar to the case of the (B) component, the (C) olefin-based copolymer is also preferred, in view of the improvement in the impact properties, to use a graft copolymer of one or more types of a polymer or copolymer composed of a repeating unit, expressed by the formula (1), being chemically bonded in branching or crosslinking mode with each other.

The kind, ratio, and method for preparation of the polymer or copolymer as the branching chain or the crosslinking chain are the same as those in the case of (B) component.

The mixing amount of the (C) olefin-based copolymer is in a range from 1 to 20 parts by weight, preferably from 2 to 15 parts by weight, to 100 parts by weight of the (A) PAS resin. If the amount of the (C) component is excessively small, the desired impact properties cannot be attained. If the amount of the (C) component is excessively large, the melt viscosity of the resin composition increases, and the mold-releasing resistance during molding operation increases, which fails to perform continuous molding operations.

In addition, the resin composition according to the present invention may contain an inorganic filler (D) to improve the performance such as mechanical strength, heat resistance, dimensional stability (resistance to deformation and to warp), and electric properties. The (D) inorganic filler may be the one in fibrous, powdery, granular, and plate shapes depending on the intended use. Examples of fibrous filler are inorganic fibrous materials such as glass fiber, asbestos fiber, carbon fiber, silica fiber, silica-alumina fiber, zirconia fiber, boron-nitride fiber, boron fiber, potassium titanate fiber, and further metallic fibrous materials such as those of stainless steel, aluminum, titanium, copper, and brass. Typical fibrous fillers are glass fiber and carbon fiber. In addition, high-melting point organic fibrous materials such as polyamide, fluororesin, and acrylic resin can also be applied. Meanwhile, for the powdery and granular fillers, applicable ones include: carbon black; silicate such as silica, quartz powder, glass bead, glass powder, calcium silicate, aluminum silicate, kaolin, talc, clay, diatomaceous earth, and wollastonite; metal oxide such as iron oxide, titanium oxide, zinc oxide, and alumina; metallic carbonate such as calcium carbonate and magnesium carbonate; metallic sulfate such as calcium sulfate and barium sulfate; silicon carbide; silicon nitride; boron nitride; and various metallic powder. The plate-shaped fillers include mica, glass flake, and various metallic foils. These inorganic fillers may be used separately or in combination of two or more of them. On using these fillers, it is preferable, if necessary, to add a converging agent or a surface-treating agent. Examples of them are functional compounds such as an epoxy-based compound, an isocyanate-based compound, a silane-based compound, and a titanate-based compound. These compounds may be subjected to surface-treatment or convergence-treatment in advance, or may be added simultaneously on preparing the materials. The use amount of the inorganic filler is in a range from 20 to 250 parts by weight, preferably from 20 to 200 parts by weight, to 100 parts by weight of the PAS resin as (A) component.

Moreover, the resin composition according to the present invention may further contain a silane compound to improve the avoidance of burr-occurrence within a range not to deteriorate the effect of the present invention. The applicable silane compound includes various types such as vinyl silane, methacryloxy silane, epoxy silane, amino silane, and mercapto silane. Examples of these silane compounds are vinyltrichloro silane, γ-methacryloxy propyltrimethoxy silane, γ-glycidoxy propyltrimethoxy silane, γ-amino propyltriethoxy silane, and γ-mercapto propyltrimethoxy silane. However, the applicable ones are not limited to them.

Adding to the above-given components, the resin composition according to the present invention may further contain small amount of other thermoplastic resin as an auxiliary additive depending on the use objectives of the resin composition. Applicable other thermoplastic resin may be any kind as far as the resin is a thermoplastic resin stable at high temperatures. Examples of these other thermoplastic resins are: aromatic polyester structured by an aromatic dicarboxylic acid such as polyethylene terephthalate and polybutylene terephthalate with diol, oxycarboxylic acid, or the like; polyamide; polycarbonate; ABS; polyphenylene oxide; polyalkyl acrylate; polysulfone; polyether sulfone; polyether imide; polyether ketone; and fluororesin. Additionally, these thermoplastic resins may be used in combination of two or more of them.

In addition, as the molded article composition according to the present invention, there may be further added known materials which are generally added to thermoplastic resins, depending on the requested performance. The known materials include stabilizer such as antioxidant, flame-retardant, coloring agent such as dye and pigment, lubricant, crystallization-enhancer, and crystal-nucleation agent.

The resin composition according to the present invention can be prepared by an apparatus and a method used generally for preparing synthetic resin compositions. A common practice is to mix necessary components, which mixture is then melt-extruded in a single screw or twin screw extruder to form pellets for molding. The resin temperature during the melt-extruding is preferably 370° C. or below to prevent thermal deterioration of the olefin-based copolymers (B) and (C). An alternative preferred method is to melt-extrude the resin component, while adding to mix an inorganic component such as glass fiber in the melt-extrusion passage.

Thus prepared material pellets can be molded by a known molding method for thermoplastic resin, such as injection molding, extrusion molding, vacuum molding, and compression molding. As of these methods, injection molding is most preferable.

The coating applied to the coated molded article according to the present invention includes a coating generally used for resin molded articles. Examples of the coating are alkyd resin coating, polyvinylbutyral coating, vinyl resin coating, epoxy resin coating, acid-setting aminoalkyd resin coating, thermosetting aminoalkyd resin coating, polyurethane coating, nitrocellulose coating, acrylic resin coating, polysiloxane coating, polyolefin-modified acrylic coating, and polyolefin coating. Furthermore, a functional coating such as conductive coating containing conductive powder such as metallic powder may be applied. In view of adhesion of coating and of handling easiness, acrylic resin coating and polyurethane coating are preferred, though not limiting to them.

Applicable coating method for the coated molded article according to the present invention may be the one generally applicable to resin molded articles. Moreover, to attain further stable adhesion of coating, the coating may be conducted by applying general surface treatment process which is used in the pretreatment of the resin coating. Examples of the surface treatment process are grinding treatment, blast treatment, solvent degreasing treatment, chemicals etching treatment, corona discharge treatment, UV irradiation treatment, gas flame treatment, plasma treatment, and photografting treatment.

The present invention can provide a PAS resin composition which has excellent impact properties and mold-releasability, and has significantly improved the adhesion with coating.

EXAMPLES

Present invention is described in detail in the following referring to Examples and Comparative Examples. The present invention is, however, not limited to these Examples and Comparative Examples. Note that the concrete materials of (A), (B), (C), and (D) used in Examples and Comparative Examples are given below.

(A) Polyphenylene Sulfide (PPS) Resin

FORTRON KPS (melt viscosity of 30 P·s at 310° C. and 1200 sec$^{-1}$ of shear rate, manufactured by Kureha Chemical Industry Co., Ltd.)

(B) Graft Copolymer (and Comparative Article)

B-1: Copolymer prepared by grafting 30 parts by weight of methylmethacrylate to 70 parts by weight of ethylene/ethylacrylate copolymer, (MODIPER A5200, manufactured by NOF Corporation)

B-2: Copolymer prepared by grafting 30 parts by weight of methylmethacrylate/butylacrylate copolymer (9/21) to 70 parts by weight of ethylene/ethylacrylate copolymer, (MODIPER A5300, manufactured by NOF Corporation)

B'-1: Copolymer prepared by grafting 30 parts by weight of methylmethacrylate to 70 parts by weight of polyethylene, (MODIPER A1200, manufactured by NOF Corporation)

B'-2: Ethylene/octene copolymer (Engage 8440, manufactured by DuPont Dow Elastomers L.L.C.)

B'-3: Ethylene/ethylacrylate copolymer (NUC-6570, manufactured by Nippon Unicar Co., Ltd.)

(C) Olefin-Based Copolymer

C-1: Copolymer prepared by grafting 30 parts by weight of methylmethacrylate/butylmethacrylate copolymer (9/21) to 70 parts by weight of ethylene/glycidylmethacrylate copolymer, (MODIPER A4300, manufactured by NOF Corporation)

C-2: Copolymer prepared by grafting 30 parts by weight of methylmethacrylate to 70 parts by weight of ethylene/glycidylmethacrylate copolymer, (MODIPER A4200, manufactured by NOF Corporation)

C-3: Copolymer prepared by grafting 30 parts by weight of styrene/acrylonitrile copolymer to 70 parts by weight of ethylene/glycidylmethacrylate copolymer, (MODIPER A4400, manufactured by NOF Corporation)

C-4: Ethylene/glycidylmethacrylate copolymer (REXPEARL RA3150, manufactured by Nippon Polyurethane Industry Co., Ltd.)

(D) Inorganic Filler

Glass fiber (chopped strand (13 μm in dia.), ECS 303T-717, manufactured by Nippon Electric Glass Co., Ltd.)

(Other)

Lubricant (tristearate of pentaerythritol, Unistar H-476, manufactured by NOF Corporation)

Examples 1 to 6, and Comparative Examples 1 to 8

The respective combinations of (A), (B), (C) components and lubricant given in Tables 1 and 2 were mixed in a Henschel mixer for 5 minutes. The mixture was charged to a twin screw extruder at 320° C. of cylinder preset temperature. Then, the (D) glass fiber was separately fed from a side-feed opening of the extruder, thereby conducting melt-extrusion of the mixture at 350° C. of resin temperature inside the extruder to form pellets of the resin composition.

Then, with an injection molding machine at 320° C. of cylinder temperature and 150° C. of observed mold temperature, there were molded Charpy test pieces, and also plate test pieces for testing coating and testing adhesion with coating, described below. Regarding the molding condition for evaluating the mold-releasing resistance, the molding evaluation was given under the following molding conditions. The results are shown in Tables 1 and 2.

The evaluation methods applied to Examples and Comparative Examples are the following.

[Charpy Impact Test]

The Charpy impact test strength was measured in accordance with ISO 179/1-eA.

[Coating and Adhesion Test with Coating (Cross Cut Test)]

(1) Resin Molded Article

Plate having the size of 60 mm×60 mm×2 mm t.

(2) Coating

Single liquid type acrylic resin coating (PL-B2, manufactured by Nippon Paint Co., Ltd.)

(3) Coating Process and Condition

Test piece→Ethanol ultrasonic washing→Drying at room temperature→Spray coating (thickness: approximately 5-10 μm) Allowing to standing for 10 minutes→Heat treatment (80° C. for 30 minutes)→Cooling at room temperature→Allowing to standing for 24 hours→Adhesion test with coating (1 mm grid cross cut test).

(4) Adhesion Test with Coating (Cross Cut Test)

Cross cut was given to the coated portion using a cutterknife, (1 mm of intervals over an area of 10 mm×10 mm). Scotch tape was attached to the cross cut face. After peeling the Scotch tape from the cross cut face, the number of peeledsegments found on the Scotch tape was counted to give the evaluation based on the criterion below.

○: Peeled percentage was less than 5%.

Δ: Peeled percentage was 5% or more and less than 35%.

X: Peeled percentage was 35% or more.

[Measurement of Mold-releasing Resistance]

The pre-determined molded articles were prepared by an injection molding machine under the condition given below. The force for pushing out the molded article from the mold was observed, and thus observed force was adopted as the mold-releasing resistance.

The apparatus for measuring the mold-releasing resistance:

MOBAC Cavity Pressure Sensor

Injection molding machine: NIKKO J75SSII-A

Cylinder temperature: 310° C.

Injection time: 12 seconds

Cooling time: 45 seconds

Mold temperature: 140° C.

TABLE 1

|  | Ex. 1 | Ex. 2 | Ex. 3 | Ex. 4 | Ex. 5 | Ex. 6 |
|---|---|---|---|---|---|---|
| (A) PPS (parts by weight) | 100 | 100 | 100 | 100 | 100 | 100 |
| (B) Graft copolymer | B-2 | B-2 | B-1 | B-1 | B-2 | B-2 |
| (parts by weight) | 5 | 5 | 10 | 5 | 5 | 10 |
| (C) Olefin-based copolymer | C-1 | C-2 | C-2 | C-1 | C-4 | C-3 |
| (parts by weight) | 5 | 10 | 5 | 15 | 10 | 5 |
| Lubricant | 1 | 1 | 1 | 1 | 1 | 1 |
| (parts by weight) |  |  |  |  |  |  |
| Glass fiber | 50 | 50 | 50 | 50 | 50 | 50 |
| (parts by weight) |  |  |  |  |  |  |
| Adhesion with coating | ○ | ○ | ○ | ○ | ○ | ○ |
| Moldability, mold-releasing resistance (N) | 450 | 500 | 350 | 550 | 550 | 350 |
| Charpy impact strength (kJ/m$^2$) | 13.5 | 14.0 | 13.5 | 14.5 | 14.5 | 13.5 |

TABLE 2

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|
| (A) PPS (parts by weight) | 100 | 100 | 100 | 100 | 100 | 100 | 100 | 100 |
| (B) Graft copolymer |  | B'-1 |  |  | B-1 | B'-2 | B'-3 | B'-3 |
| (parts by weight) |  | 5 |  |  | 10 | 5 | 10 | 5 |
| (C) Olefin-based copolymer | C-4 | C-2 | C-1 |  |  | C-1 |  | C-1 |
| (parts by weight) | 10 | 10 | 10 |  |  | 5 |  | 5 |
| Lubricant | 1 | 1 | 1 | 1 | 1 | 1 | 1 | 1 |
| (parts by weight) |  |  |  |  |  |  |  |  |
| Glass fiber | 50 | 50 | 50 | 50 | 50 | 50 | 50 | 50 |
| (parts by weight) |  |  |  |  |  |  |  |  |
| Adhesion with coating | ○ | X | ○ | ○ | ○ | X | X | X |
| Moldability, mold-releasing resistance (N) | 1900 | 600 | 1450 | 300 | 350 | 400 | 350 | 450 |
| Charpy impact strength (kJ/m$^2$) | 14.0 | 14.5 | 13.5 | 9.0 | 9.5 | 13.0 | 9.0 | 14.0 |

The invention claimed is:

1. A polyarylene sulfide resin composition comprising (A) 100 parts by weight of a polyarylene sulfide resin; (B) 1 to 20 parts by weight of a graft copolymer composed of (b-1) an olefin-based copolymer composed mainly of an α-olefin and an α,β-unsaturated carboxylic acid ester, without containing glycidyl group, and (b-2) at least one polymer or copolymer composed of a repeating unit expressed by the formula (1), (b-2) being chemically bonded in branching or crosslinking on (b-1),

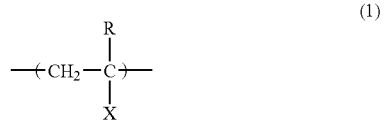

(1)

where R is a hydrogen atom or a lower alkyl group, and X is one or more groups selected from —COOCH$_3$, —COOC$_2$H$_5$, —COOC$_4$H$_9$, —COOCH$_2$CH(C$_2$H$_5$)C$_4$H$_9$, —C$_6$H$_5$, and —CN; and (C) 1 to 20 parts by weight of an olefin-based copolymer composed mainly of an α-olefin and a glycidyl ester of an α,β-unsaturated acid.

2. The polyarylene sulfide resin composition according to claim 1, wherein the olefin-based copolymer (b-1) without a glycidyl group is composed of ethylene and at least one selected from ethyl acrylate, methyl acrylate and methyl methacrylate.

3. The polyarylene sulfide resin composition according to claim 1, wherein (C) the olefin-based copolymer composed mainly of an α-olefin and an α,β-unsaturated carboxylic acid glycidyl ester is a graft copolymer having at least one polymer or copolymer constituted of a repeating unit represented by the formula (1) as shown above, chemically bonding in branching or crosslinking.

4. The polyarylene sulfide resin composition according to claim 1, wherein (B) the graft copolymer is a graft copolymer having a copolymer (b-2) composed of methyl methacrylate and/or butyl acrylate, chemically bonding as a branch.

5. The polyarylene sulfide resin composition according to claim 1, comprising (D) 20-250 parts by weight of an inorganic filler relative to (A) 100 parts by weight of the polyarylene sulfide resin.

6. A coated molded article obtained by joining a coating material on the surface of a molded article formed by molding a polyarylene sulfide resin composition according to claim 1.

7. A coated molded article comprising the polyarylene sulfide resin composition according to claim 1.

8. The polyarylene sulfide resin composition according to claim 2, wherein (C) the olefin-based copolymer composed mainly of an α-olefin and an α,β-unsaturated carboxylic acid glycidyl ester is a graft copolymer having at least one polymer or copolymer constituted of a repeating unit represented by the formula (1) as shown above, chemically bonding in branching or crosslinking.

9. The polyarylene sulfide resin composition according to claim 2, wherein (B) the graft copolymer is a graft copolymer having a copolymer (b-2) composed of methyl methacrylate and/or butyl acrylate, chemically bonding as a branch.

10. The polyarylene sulfide resin composition according to claim 3, wherein (B) the graft copolymer is a graft copolymer having a copolymer (b-2) composed of methyl methacrylate and/or butyl acrylate, chemically bonding as a branch.

11. The polyarylene sulfide resin composition according to claim 4, wherein (B) the graft copolymer is a graft copolymer having a copolymer (b-2) composed of methyl methacrylate and/or butyl acrylate, chemically bonding as a branch.

12. The polyarylene sulfide resin composition according to claim 2, further comprising (D) 20-250 parts by weight of an inorganic filler relative to (A) 100 parts by weight of the polyarylene sulfide resin.

13. The polyarylene sulfide resin composition according to claim 3, further comprising (D) 20-250 parts by weight of an inorganic filler relative to (A) 100 parts by weight of the polyarylene sulfide resin.

14. The polyarylene sulfide resin composition according to claim 4, further comprising (D) 20-250 parts by weight of an inorganic filler relative to (A) 100 parts by weight of the polyarylene sulfide resin.

15. The polyarylene sulfide resin composition according to claim 8, further comprising (D) 20-250 parts by weight of an inorganic filler relative to (A) 100 parts by weight of the polyarylene sulfide resin.

16. The polyarylene sulfide resin composition according to claim 9, further comprising (D) 20-250 parts by weight of an inorganic filler relative to (A) 100 parts by weight of the polyarylene sulfide resin.

17. The polyarylene sulfide resin composition according to claim 10, further comprising (D) 20-250 parts by weight of an inorganic filler relative to (A) 100 parts by weight of the polyarylene sulfide resin.

18. The polyarylene sulfide resin composition according to claim 11, further comprising (D) 20-250 parts by weight of an inorganic filler relative to (A) 100 parts by weight of the polyarylene sulfide resin.

19. A coated molded article obtained by joining a coating material on the surface of a molded article formed by molding a polyarylene sulfide resin composition according to claim 2.

20. A coated molded article obtained by joining a coating material on the surface of a molded article formed by molding a polyarylene sulfide resin composition according to claim 3.

* * * * *